Feb. 5, 1952 H. H. HAGLUND 2,584,125
ANGULAR RATE GYROSCOPE
Filed July 2, 1945
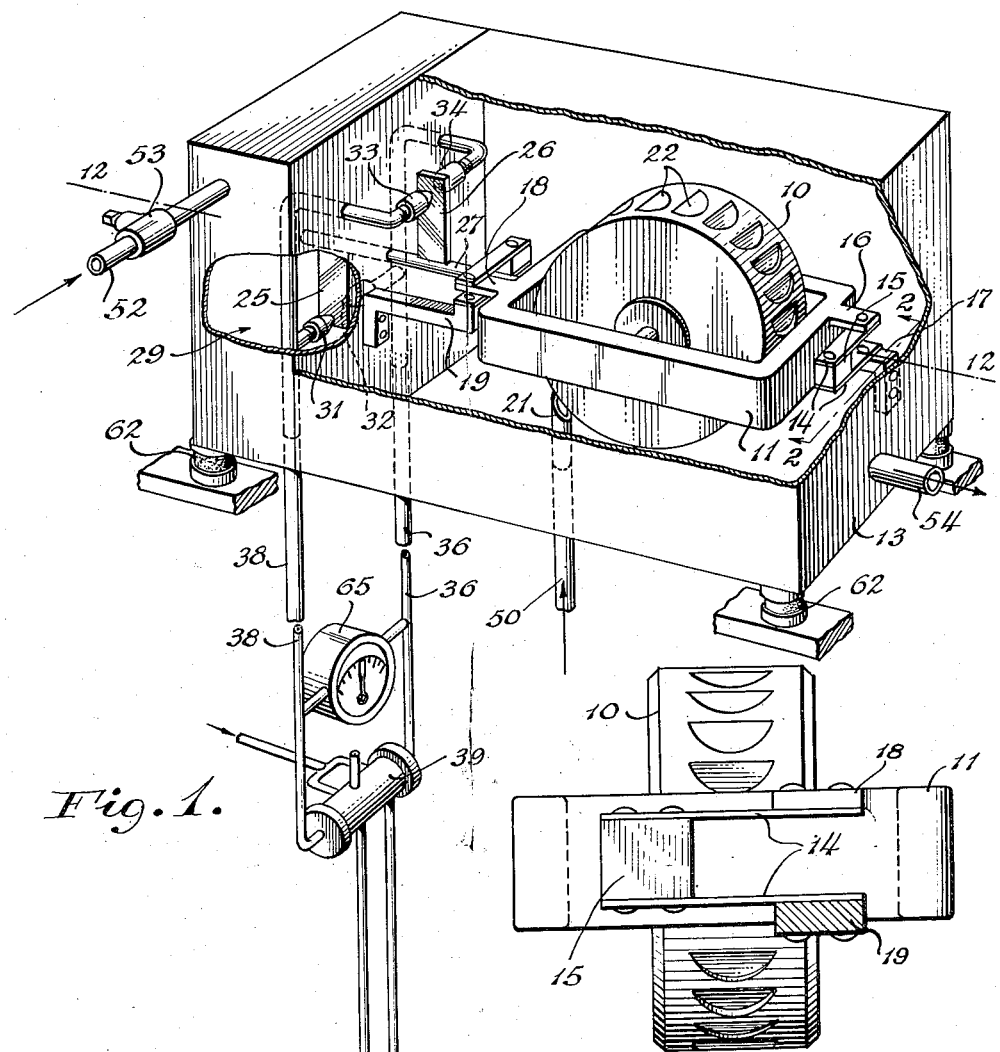
Fig.1.
Fig.2.
INVENTOR
HOWARD H. HAGLUND
BY
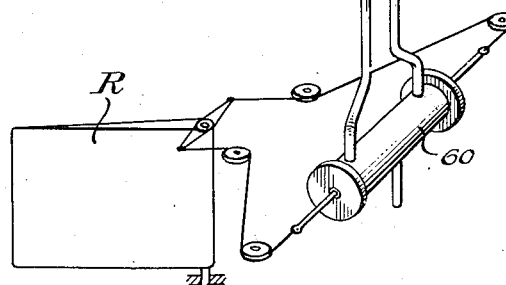
his ATTORNEY.

Patented Feb. 5, 1952

2,584,125

UNITED STATES PATENT OFFICE 2,584,125

ANGULAR RATE GYROSCOPE

Howard H. Haglund, Pelham, N. Y., assignor to The Sperry Corporation, a corporation of Delaware Application July 2, 1945, Serial No. 602,834

9 Claims. (Cl. 74—5.6)

The present invention relates to angular rate gyroscopes, and more particularly to gyroscopes for measurement of angular rates of movement of an aircraft about any one of its yaw, pitch and roll axes and for control of the aircraft in response to such measured rates. Many features of the invention also have application to angular rate gyros used in fire control for generating target rates and for other purposes.

In the automatic control of aircraft as to direction and attitude, it is usual to provide means responsive, directly or indirectly, to deflection of the aircraft from its predetermined direction or attitude, and operative to move the rudder, elevator or ailerons in a corrective sense.

Control needs differ among the three axes. Control about the yaw axis, i. e., steering in azimuth, presents special problems. Most airplanes display in yawing movements a large amount of inertia and small damping. Moreover, many airplanes display considerable directional ("weathercock") stability, that is, yawing moment due to sideslip. This characteristic has the effect of tending to prevent the airplane from sideslipping, by turning it into the relative wind.

These several properties combine to cause the transient response of an airplane to yaw disturbances to be of an oscillatory nature. Thus, in many airplanes if the rudder is kicked momentarily, the airplane will oscillate or hunt through one or more cycles before settling in its original direction.

The period of such oscillation in yaw is, in many airplanes, of the order of one or two seconds.

One purpose of my improved automatic control in yaw is to counteract and damp the oscillations mentioned above. In an airplane that is momentarily hunting in yaw, the control moment (either that due to the aerodynamic properties of the airplane, or one artificially created by a faulty automatic control means) is approximately 180 degrees out of phase with respect to the airplane movement. To stop the oscillations, I propose to provide a control moment that leads the airplane movement. In this manner, the oscillations are opposed and eventually subside. The more nearly the phase lead of the control moment approaches 90 degrees during an oscillation, the more nearly aperiodic (non-oscillatory) and stable is the movement of the airplane. Again, the greater the control moment itself that can be established upon appearance of a deflection, the quicker the airplane will turn to its original direction. In short, to obtain a non-hunting and a tight control, the control moment should be applied with large phase angle lead and in large amount.

In some automatic rudder control systems angular rate gyroscopes find use, either alone or in combination with angular displacement responsive devices. Such gyroscopes include a rotor so mounted in a gimbal ring as to provide only two angular degrees of freedom, one being the rotor spin axis and the other being about the gimbal ring axis, at right angles to the axis and about which ring axis rates are to be measured. The angular movement of the gimbal ring, i. e., the second degree of freedom, is centralized by being under spring restraint in both directions from normal. In such gyroscopes the gimbal ring tips or precesses through an angle proportional to rate of turn about the second axis and in a direction changing with the direction of turn. Through a suitable pickoff and servo system the rudder is actuated in response to such tipping.

An ideal rate instrument would produce a signal, of useful amplitude, which is at all times proportional to rate of angular movement of the airplane and which in a sinusoidal oscillation leads the airplane movement in phase by exactly 90 degrees (just as the first derivative of a sine wave is a wave of similar shape 90 degrees in lead).

In general, rate gyroscopes of kinds hitherto known fall far short of achieving these results, especially at the higher control frequencies because their signals lead the airplane movement by amounts much less than 90 degrees and, hence, for aircraft, wherein these high frequencies are encountered, become almost worthless as controllers.

According to the present invention, there is provided an angular rate gyroscope which closely approaches the ideal of developing a signal of useful amplitude, 90 degrees out of phase with respect to movement of its support and at all times proportional to rate of movement of the support.

The invention is based in part on the discovery that by giving the rate gyroscope a natural frequency of vibration about the gimbal ring axis, which is much higher compared to the usual frequencies of vibration of the airplane itself about the yaw and other axes, the proper lead angle may be obtained and in a simple construction for achieving this purpose. The gyroscope of the present invention is so constructed, in regard to the rotor moment of inertia and velocity, the gimbal moment of inertia and the resiliency or stiffness of the spring restraint, as to have a natural frequency of the order of 20 or more cycles a second which is many times as high as the usual resonant frequencies of airplanes in yaw, roll or pitch (on the order of 1 or 2 cycles per second). This high resonant frequency also has the advantage that it saves the gyroscope from disturbance due to the vibrations of the airplane. To the same end, friction about the precession axis is substantially eliminated by using a spring support without bearings.

The foregoing may be restated in simpler although perhaps less scientific language as follows: According to my invention, I so design the rate gyro that upon the sudden initiation of a turn at any rate likely to be encountered, the gryoscope will very quickly reach its correct angular position representing such rate. For instance, with a gyro with a natural frequency mentioned above, such position would be reached in about 1/20 of a second.

It is essential to employ a number of factors to achieve this result. First, it is essential that the angle through which the gyro must precess to reach such position must be held to a very small angle, such as, an angle on the order of one degree for normal rates of turn of the craft. Second, any factors tending to delay such precession must be avoided. For this purpose, all bearing friction is avoided by employing centralizing springs to furnish freedom about the precession axis instead of actual bearings. In addition, no damping means whatever is employed about the precession axis as has been universally the custom in rate of turn gyroscopes. Third, in order to obtain such quick response the gyroscopic moment should be made small as compared to the stiffness of the centralizing springs, or stated conversely, the centralizing spring should be made very stiff as compared to the gyroscopic moment. With such construction, the high natural frequency above stated is readily obtained. Fourth, it is also essential that there be provided in combination with the quickly responsive rate gyroscope above described, a very sensitive pick-off means responsive to the gimbal precession, which is characterized by the ability to produce a large effective signal upon very slight gimbal tip. Such characteristic is desirable in order to take full advantage of the high resonant frequency and stiffness of the centralizing springs. When all of such factors are incorporated, a rate gyroscope results having a natural frequency of precession about its gimbal axis which is very much higher than the usual frequencies of oscillation of the airplane itself about its principal axes as hereinbefore stated.

In order to minimize friction effects and to provide the necessary spring restraint with as little weight and complication as possible, the gyroscope is supported by a leaf spring suspension so constructed as to afford the requisite degree of resiliency about gimbal axis while being very stiff as regards straight-line accelerations.

Thus, the use of gimbal bearings with their attendant friction is also avoided. By completely eliminating gimbal friction, it is possible to use a small rotor and thereby achieve the desired quick response and high resonant frequency, without loss of sensitivity.

By my improved construction I am also enabled to eliminate the usual damping means employed about the precession axis of the gyroscope. This damping means usually takes the form of a viscous dashpot arrangement, although in a certain prominent prior art construction employing a spring mounting for the gimbal of the gyroscope, a highly viscous drag disc arrangement has been used, not only for damping the gyroscope but also for avoiding shocks to the same through vibration of the airplane. By my construction, however, I have found all such damping arrangements unnecessary when the instrument as a whole is shock-mounted on the aircraft, as is the usual practice, thereby further simplifying and lightening the construction of the gyroscope. Such shock mounting is illustrated in the drawings by showing the outer casing mounted on rubber shock mountings of any standard type.

The rate gyroscope of the invention has proved in actual flight to afford eminently satisfactory control of an airplane, and also operates as a rate-of-turn indicator in a superior manner. When governing the rudder through a suitable servo system, it responds quickly to deflections of the airplane and returns the airplane to course without overshooting or hunting. The same properties of lightness, stiffness and avoidance of friction that make for its effectiveness as a controller are also advantageous for other uses and for other reasons such as ability to withstand bumps and shocks, and general reliability.

In the accompanying drawings there is shown more or less diagrammatically an example of specific embodiment of apparatus within the purview of the invention and diagrams illustrative of the performance thereof.

In the drawings,

Fig. 1 is a diagrammatic perspective view, with parts broken away, of my invention as applied to the control of the rudder of an aircraft in automatic pilot system.

Fig. 2 is a detailed front elevation, partly in section, of the gyroscope proper, the section being taken on line 2—2 of Fig. 1.

Referring to the drawings, in Fig. 1 the rate gyro is shown as including a rotor 10 mounted in suitable ball bearings (not shown) in a gimbal ring 11. The gimbal ring is advantageously made of a light metal and is so constructed as to have a minimum moment of inertia about gimbal axis 12. The gimbal ring is supported at each end from a case 13 by means of leaf spring assemblies of special construction which both rotationally mount and resiliently centralize the ring. The right assembly includes two similar leaf springs 14 riveted or otherwise anchored to a block 15, to a gimbal attachment strip 16 and to a bracket 17 as shown. The left assembly (Fig. 2) is similar but reversed in direction and includes gimbal attachment strip 18 and a flat bracket 19 as shown. Brackets 17 and 19 are attached to the outer casing 13.

Each spring assembly can be regarded as a pair of flexible cantilever beams supporting the gimbal ring from the base, by which the gimbal ring is constrained to rotate about an axis 12, which in practice remains very accurately fixed in location throughout all normal attitudes of the gyroscope. The spring construction is readily adapted to afford the requisite limited freedom to precession about axis 12 while being very stiff in directions at right angles thereto, which protects the rate gyro from damage due to high linear accelerations in the airplane, and prevents shaking or shifting of the gimbal ring in the direction of axis 12. For best results, the length of the unsupported part of the springs is approximately equal to the thickness of block 15, as shown. If desired the springs can be arranged to extend at right angles to the rotor axis instead of parallel thereto.

The rotor is driven at a suitable speed, say 10,000 to 30,000 revolutions a minute, by an air jet 21 cooperating with buckets 22 in a known way, or by any other suitable means.

Signal generating or pickoff means are provided for the gyro gimbal ring, shown as of differential air flow type and including two spaced flapper valves 25, 26, each carried by a shaft 27 extended from the gimbal ring.

Either a pressure or vacuum system may be employed. If the latter, the outer casing 13 is preferably made air-tight and is continuously exhausted of air by a pipe connection 54 running to a vacuum pump (not shown). Several jet intakes lead within the casing, one through pipe 50 to spin the rotor through connected nozzle 21. Two other intakes are provided by small nozzles 33 and 34 terminating pipes 36 and 38 leading to the relay or transfer valve 39 controlling the hydraulic or other servo motor 60 for rudder R. Said nozzles are positioned oppositely to each other with the flapper valve 26 between the same, so that in the mid position the flow of air from the two nozzles is equal, but as the flapper valve rotates slightly in one direction or the other, the flow of air from one nozzle is restricted and from the other increased, thereby differentially varying the rate of flow, and hence the pressure in the pipes 36 and 38. The other nozzles 31 and 32 provide bleeds for said pipes and are preferably placed within the chamber 29, which is otherwise sealed from casing 13. Chamber 29 is connected with the atmosphere through a pipe 52 preferably having a variable needle valve 53 therein and is therefore maintained at a pressure intermediate between atmospheric pressure and the vacuum within casing 13. It will be seen that as the valve 26, for instance, further restricts the nozzle 33 by a counter-clockwise movement in Fig. 1, valve 25 will further open bleed nozzle 31 and, at the same time, as valve 26 further opens nozzle 34, the valve 25 will further restrict the bleed nozzle 32. This action increases the differential pressure in the pipes 36, 38 and also results in the use of less air.

The pickoff means described is remarkably economical in air consumption and it is furthermore very sensitive, giving a signal of useful amplitude upon displacement of the flappers of only a few thousandths of an inch. The pickoff sensitivity can readily be adjusted by turning the threaded nozzles to reduce or increase the gap between flapper and nozzle. A pickoff capable of promptly producing a useful output signal even on very small deflections of the gimbal ring, such as described, is of aid in obtaining the advantages noted. Thus, a sluggish pickoff or a weak pickoff would make for loss in phase angle lead. The rate gyroscope signal would no longer lead the displacement by nearly 90 degrees, as is desired, but by some smaller angle.

A differential pressure gage 65 may be connected across pipes 36, 38, if desired, showing the rate and direction of turn. In fact, such an indicator may be used with my improved rate gyro without an automatic pilot system, merely as an accurate and sensitive rate-of-turn indicator. Such an indicator interposes no load upon the gyroscope and calls for no extension of the gimbal axis through the evacuated casing 13, thereby avoiding leaks. Of course, a simple pointer connected to the gimbal might be substituted, if desired, as a rate-of-turn indicator.

As stated above, some damping is desirable with any rate gyroscope. The higher the natural frequency of the gyroscope relative to the resonant frequency of the airplane, the less is the damping required. According to my invention sufficient damping is provided by shock mounting or cushioning the outer casing 13 or the entire control device, the shock mounts represented at 62 providing sufficient damping without need for other expedients. By this means any direct retarding means acting about the precession axis is avoided.

Rate gyroscopes made according to the invention, in addition to having the high frequency properties described above are very sensitive, giving a reliable and useful signal when subjected to rates of turn of as little as 5 degrees a minute and less, i. e., turn rates less than that of the minute hand of a clock. They are also very rugged due to the lightness of the supported mass, the stiffness of the springs, and the absence of rubbing parts in the support and pickoff system. It will be understood, of course, that the gyro may be mounted about any axis desired, whether horizontal, vertical or inclined.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an angular rate gyroscope a support, a rotor, a gimbal ring for the rotor, and resilient suspension means for the gimbal ring comprising a leaf spring fixed at one end to the support adjacent an end of the gimbal ring and extending in a direction away from the rotor axis, a second leaf spring fixed at opposite end to the end of the gimbal ring and extending generally in the direction of the first leaf spring, and spacer means secured to the unfixed ends of said leaf springs; whereby a precession axis is provided and defined for the gimbal ring and rotor under resilient restraint.

2. In an angular rate gyroscope a support, a rotor, a gimbal ring for the rotor and resilient suspension and restraint means for the gimbal ring comprising a leaf spring fixed at one end to the base adjacent an end of the gimbal ring and extending in a direction away from the rotor axis, a second leaf spring fixed at its other end to the gimbal ring and extending substantially in the direction of the first leaf spring, and spacer means between the free ends of said leaf springs fastening said ends together, the spacer means being substantially as thick as the length of the unsupported section of said springs lying between the points of attachment of the springs to the spacer means and to the base and gimbal ring.

3. In a differential air flow, pickoff means for detecting relative angular movement of a gyroscope or the like and producing a pressure signal in accordance with the amount and direction of such movement, comprising means defining a first chamber provided with a pair of ports opening therein, means for maintaining within said first chamber a fluid pressure below that outside the chamber, means providing a second chamber provided with a pair of ports therein, a differential pressure device, separate conduit means between each port of the first pair and said device, each of said second pair of ports constituting a bleed into one of said conduit means respectively, and shutter means movable with respect to and in cooperative relation to said first pair of ports and said second pair of ports and adapted on precession of the gyroscope to increase the opening of one port of the first pair and to decrease the opening of the port of the second pair bleeding into the conduit of the first mentioned port.

4. A differential air flow pickoff for gyroscopes as claimed in claim 3, in which said second chamber has a pressure intermediate between that of said first chamber enclosing the first pair of ports and the atmosphere.

5. In an angular rate gyroscope a support, a rotor, a gimbal ring for the rotor, and suspension and resilient restraint means for the gimbal comprising at each end thereof, a leaf spring fixed at one of its ends to the base adjacent an end of the gimbal ring and extending in a direction away from the rotor axis and a second leaf spring fixed at one of its ends to the gimbal ring and extending substantially in the direction of the first leaf spring, the direction in which the leaf springs at one end of the gimbal ring extend being opposite to that in which the other leaf springs extend and spacer means between the unfixed ends of each of said pairs of springs; whereby the gimbal ring is supported for restrained rotation about an axis extending between each pair of springs.

6. In an angular rate gyroscope as set forth in claim 1, for controlling movements of an aircraft about an axis, the stiffness of the resilient means being so correlated with respect to the moment of inertia of the rotor and frame about the precession axis, as to impart to the rotor and frame a resonant frequency of oscillation a plurality of times greater than the normal resonant frequencies of the aircraft about the axis of control.

7. In an angular rate gyroscope as set forth in claim 2, the stiffness of the resilient means being so correlated with respect to the moment of inertia of the rotor and frame about the precession axis, as to impart to the rotor and frame a resonant frequency of oscillation on the order of 20 cycles per second.

8. In an automatic pilot for aircraft, an angular rate gyroscope for controlling turning of the craft about an axis, a support for said gyroscope, a rotor bearing frame and spring means connecting opposite ends of said frame with said support for both centralizing and pivoting said frame for precession about an axis at right angles to said first-named axis, said spring means being sufficiently stiff as compared to the moment of inertia of the rotor and frame about the precession axis to impart to the rotor and frame a resonant frequency of oscillation on the order of twenty or more times that of the normal frequency of the aircraft about the axis of control, pick-off means about said precession axis sensitive to small precessional movements of the gyro and a servo motor controlled thereby for controlling the turning of said aircraft.

9. In an angular rate gyroscope, a support, a rotor, a gimbal ring supporting the rotor for rotation about a spin axis, and resilient suspension means for said gimbal ring comprising a pair of spring members connecting the ends of the gimbal ring with said support, said spring members each comprising a substantially U-shaped spring extending in a plane substantially parallel to the plane including said spin axis and having one of the open ends thereof connected to the gimbal ring and the other of the open ends thereof connected to said support whereby to both centralize and pivot said gimbal for limited precessional movements about an axis at right angles to said spin axis.

HOWARD H. HAGLUND.

REFERENCES CITED

The following references are of record in the file of this patent:

UNITED STATES PATENTS

| Number | Name | Date |
|---|---|---|
| 1,592,081 | Colvin | July 13, 1926 |
| 2,036,914 | Brown | Apr. 7, 1936 |
| 2,208,666 | De Florez | July 23, 1940 |
| 2,210,916 | Kenyon et al. | Aug. 13, 1940 |
| 2,291,612 | Draper | Aug. 4, 1942 |
| 2,345,169 | Wunsch et al. | Mar. 28, 1944 |
| 2,384,838 | Kellogg, 2d | Sept. 18, 1945 |

FOREIGN PATENTS

| Number | Country | Date |
|---|---|---|
| 836,903 | France | Oct. 25, 1938 |
| 90,448 | Sweden | Aug. 5, 1937 |